(No Model.) 2 Sheets—Sheet 1.
C. E. EMERY.
METHOD OF AND APPARATUS FOR RATING WATCH BALANCES.
No. 469,967. Patented Mar. 1, 1892.
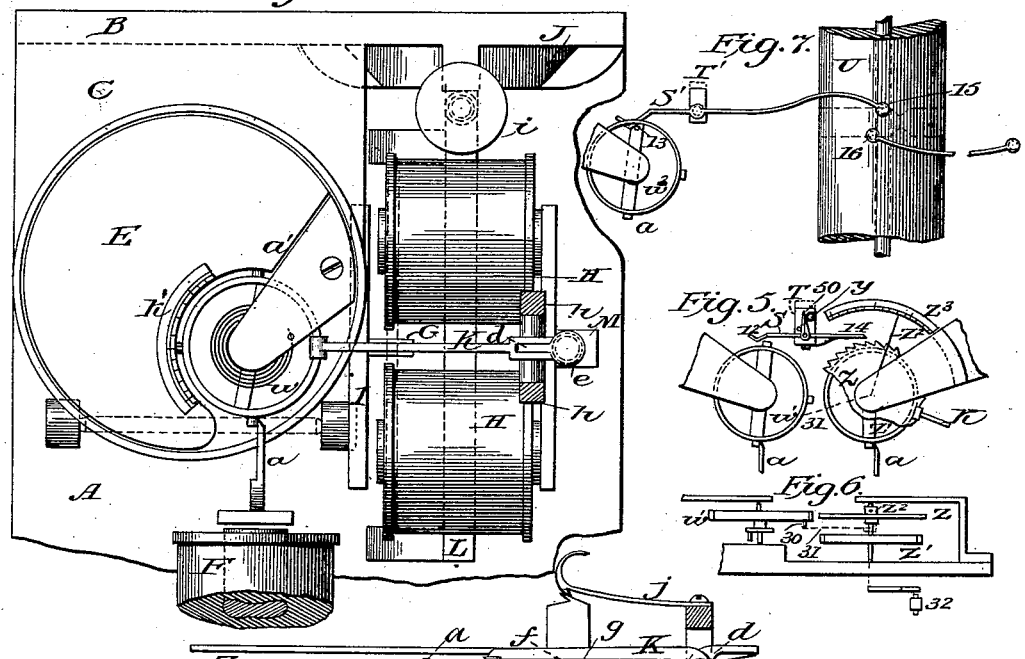
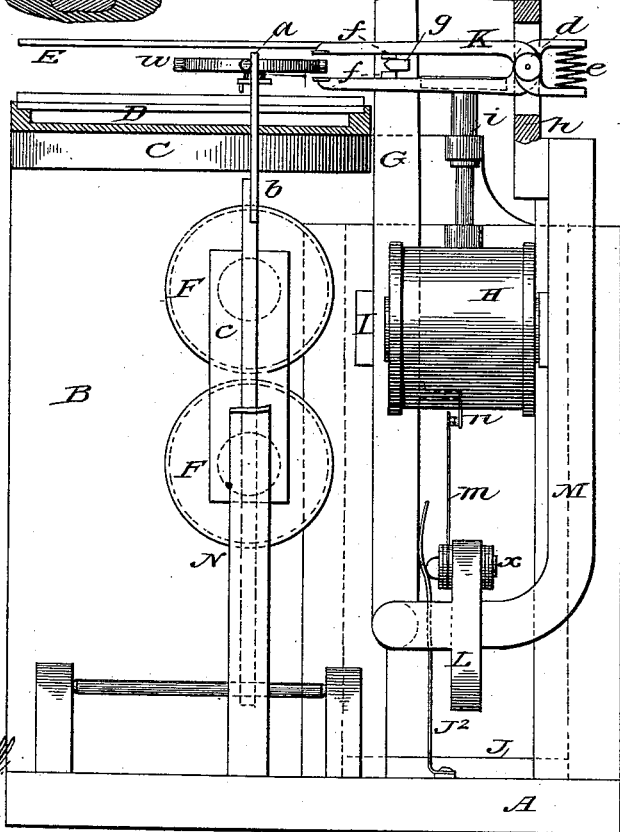
Witnesses.
J. A. Ruoff
E. J. Van Rosdall
Inventor.
Chas. E. Emery

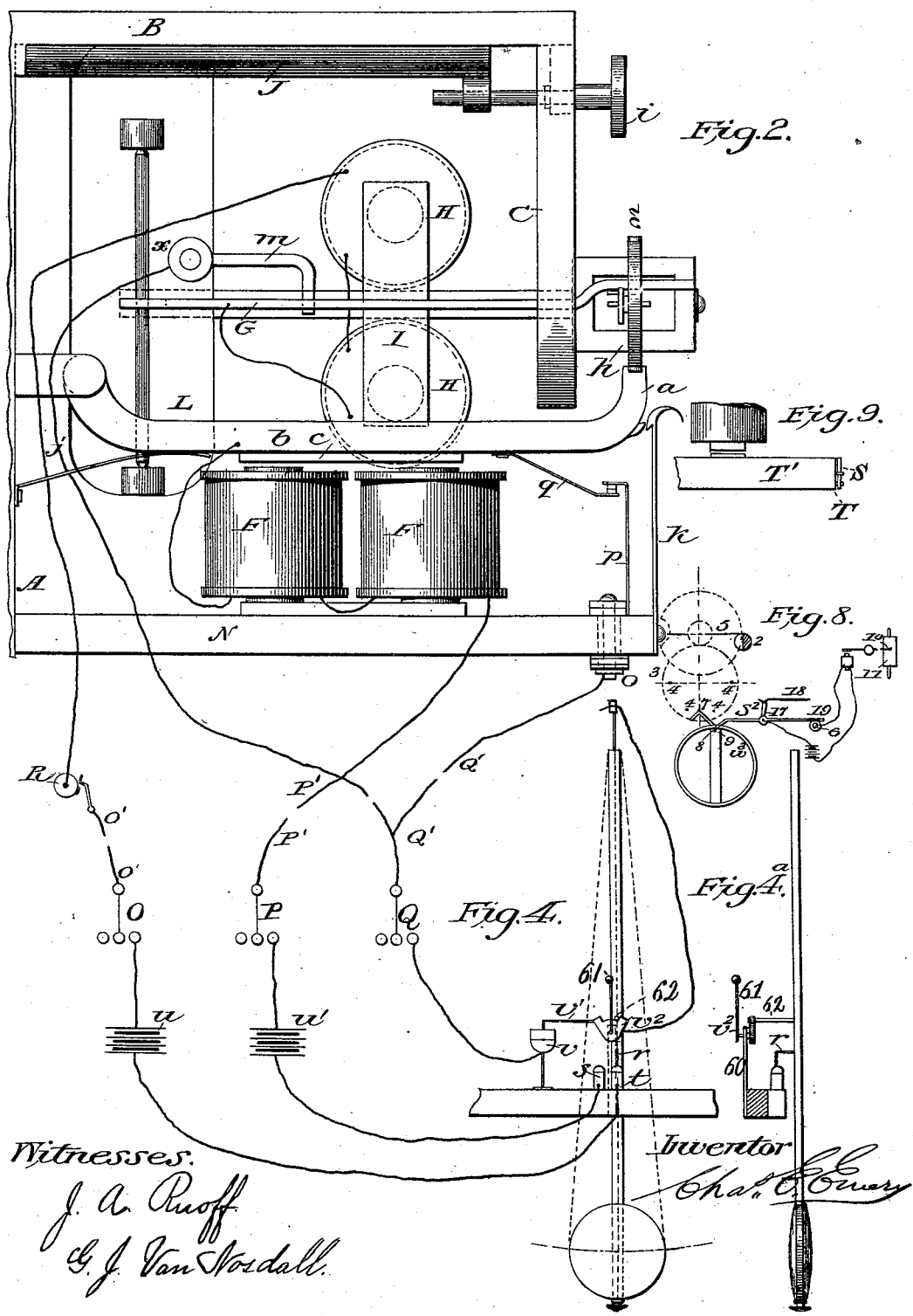

UNITED STATES PATENT OFFICE.

CHARLES E. EMERY, OF BROOKLYN, NEW YORK.

METHOD OF AND APPARATUS FOR RATING WATCH-BALANCES.

SPECIFICATION forming part of Letters Patent No. 469,967, dated March 1, 1892.

Application filed April 10, 1891. Serial No. 388,414. (No model.)

*To all whom it may concern:*

Be it known that I, CHARLES E. EMERY, of Brooklyn, Kings county, New York, (office, New York city,) have invented new and useful Improvements in the Method of and Apparatus Employed for Rating Watch-Balances; and I do hereby declare that the following is a full, clear, and exact description of the same, reference being had to the accompanying drawings, making part of this specification.

The object of this invention is to provide a method and apparatus for determining the rate of a watch or of a watch-balance with accuracy by observations at the beginning and end of short intervals. It is known that balances and hair-springs have been adapted to each other by ascertaining the number of vibrations of the same in a time fixed by a stopping device in a standard movement and that corresponding apparatus has been made more delicate by causing the standard to make a very large number of vibrations in a second and stopping it with a movement carrying the balance and spring to be tested. All such devices fail in absolute accuracy, from the fact that a stop-motion on a train can only act after a given number of full beats of the balance, and even then is not sufficiently delicate, for the reason that it is operated by parts moving at a comparatively slow velocity.

In a previous application, Serial No. 350,256, I have shown means by which the balance of a watch can be optically compared with a standard-balance or equivalent while in motion at its highest velocity. This secures accuracy, on the principle that the balance which controls the accuracy of the time-piece as a whole should during each beat reach a given position at a time corresponding to its rate for a longer interval.

It is provided in this specification to cause the standard to actually stop the balance to be tested near mid-movement after a beat or two and again after an interval of a minute or more, when the change in the angular position of a point on the balance will indicate the change in rate. In a modification of the apparatus a disk or index carried by the standard is similarly stopped by the balance to be tested, and in still another modification the positions of the latter and of the standard are compared by means of a chronograph.

The general features of operation may be specifically understood by a brief description without the aid of drawings. Confining such description to a balance making five beats per second and considering for simplicity that the motion of the balance for each beat is through a full circle of three hundred and sixty degrees, it is evident that the balance stops and reverses its direction at the end of an arc of three hundred and sixty degrees every one-fifth of a second.

In one modification of the invention it is proposed to detain the balance at the end of the arc above mentioned, or one hundred and eighty degrees from mid-position, by a catch operated by an electro-magnet to release the balance one-tenth of a second before the even second. The circuit of such electro-magnet is to be closed by a standard clock or equivalent at the proper time, and the same clock about one-tenth of a second after is to close another electric circuit to energize another magnet, which operates a clamp or grip and stops the balance at or near the time it is moving at its highest velocity. The actual angular position of the point of reference on the balance can then be read from a stationary scale on the movement, the balance be again caught by the electro-magnet first named at the extreme end of its movement, released, as before, about one-tenth of a second before the even second, and the balance be allowed to run for one or more minutes and then stopped, as before, on the even second by the clock, electro-magnet, and grip mentioned, when the change in the angle of the balance from that determined on the first observation will give a correct indication of the rate of the watch, whether fast or slow, with sufficient accuracy to determine the approximate rate for twenty-four hours.

In a second modification of the invention a standard-balance and one to be tested are to be erected near each other, both started together electrically in the same way as described above, and a disk carried by the standard stopped at a prearranged time by the balance to be tested, when the difference in the position of the disk, if stopped after one or two beats and if stopped after one or two minutes, will, as before, indicate the rate of the balance under observation.

In a third modification of the invention the motion of the balance to be tested operates the stylus or pencil of a chronograph, making a record for comparison with a corresponding record derived from a standard clock or equivalent.

The several modifications embody the same principle of operation and have various details in common, though each embodies some distinctive features in mechanism. The apparatus for receiving a watch-movement, when undergoing test as above stated, is termed a "comparator."

In the drawings, Figure 1 shows a plan view of a comparator arranged for operation in accordance with the first modification above stated. Fig. 2 is a side view, and Fig. 3 is a front view of the same. Fig. 4 is a front view of a pendulum, and embodies a diagram view of electrical apparatus for connecting the pendulum as a standard with the magnets shown in the other views, particularly Fig. 2. Fig. 4$^a$ is a side view of the pendulum and of the vibrating circuit-breaker operated thereby. Fig. 5 is a diagram plan view of a balance to be tested and of a standard-balance carrying a recording-disk, showing also the distinctive mechanism necessary for operation in accordance with the second modification above referred to. Fig. 6 is a diagram elevation of the same balances and disk. Fig. 7 is a diagram plan view of a balance to be tested and of the cylinder of a chronograph and shows the distinctive details required for operation in accordance with the third modification above referred to. Fig. 8 is a diagram view of an adaptation of the apparatus shown in Fig. 6, so that the chronograph may be in one room and the watch-movement in another room or compartment and kept at a regulated temperature, if desired, as in rating watches for temperature. Fig. 9 is a side view of an armature-lever the end of which corresponds to the slide T, Fig. 5.

The necessary details of operation in accordance with the first modification above stated are shown complete in Figs. 1, 2, 3, and 4, with the exception of certain common devices well known to experts, such as adjusting-screws for retracting-springs and at the ends of the cone-journals of the armature-levers and like details which have no bearing on the invention itself. For convenience the comparator is made with an L-shaped frame consisting of the base A and back B. Protruding horizontally from the latter is a shelf C, which receives the tool D, adapted to receive a watch-movement E and to bring by means of proper dowel-pins and guides (not shown) any one of a number of such movements exactly to the same position on the shelf C. The balance is designated $w$. The catch for detaining one of the screws of the balance when the hair-spring of the latter is partially wound up—say one-half turn, as previously referred to—is designated $a$ and is attached to the upper part of an armature-lever $b$, properly pivoted to bearings at the bottom and carrying an armature $c$ in proper position in relation to the poles of a horseshoe electro-magnet F F.

K is a clamp for stopping the balance. Its two parts are jointed together at $d$ and cross each other like the two blades of a pair of shears, and the outer ends are made to receive a coiled spring $e$ under tension and tending to close the points of the clamps together at the left. The position of the movement and the elevation of the clamps is so adjusted one in relation to the other that the points of the clamps normally stand just clear above and below the rim of the balance, being held open by pins $ff$ inside the jaws of the clamp bearing on a stop $g$, carried by the upper end of an armature-lever G, to which is attached an armature I, properly arranged in relation to a horseshoe electro-magnet H. To provide for any necessary adjustment of the clamp vertically in relation to the balance, a slide J runs in a dovetailed groove formed between ribs on the back B of the frame and carries an arm L, projecting toward the front, which is provided at the left with lugs to receive the cone-bearings of the armature-lever G and at the right with the rigid arm M, which supports the electro-magnet H through the rear iron bar corresponding to and opposite the armature. An extension $h$ of the support M carries the bearing $d$ of the clamp K, and as the jaws of the clamp are held apart and supported by the stud $g$ it is evident that the whole magnet with the armature-clamp and its supports may be moved up and down with the sliding piece J by operating a suitable screw $i$. When the electro-magnet H is energized and attracts its armature I, thereby moving the armature-lever G, the stud $g$ is pulled from between the stops $ff$ on the arms of the clamp K, and by the action of the spring $e$ the clamp-arms close from above and below upon the rim of the balance and stop its motion. The points of the clamps may have leather secured to the same to avoid injuring the polish, and by properly arranging the weight of the clamp-arms, the adjustment of the clamp in relation to the balance, and the strength of the spring $e$ the balance may be clamped and stopped suddenly without injury to itself or its pivots, since the upward and downward pressures are the same and there is no tendency to throw the balance out of line.

The support $h$ carries at its top a small spring-catch $j$, provided at its left-hand end with a hook to engage with a corresponding hook-shaped projection on the top of the armature-lever G when the same is drawn to the right by the action of the electro-magnet. In Fig. 2 $k$ is a similar spring for detaining the armature-lever $b$ when drawn toward the magnet F F. The latter magnet is supported by an arm N, attached to the base A of the frame. One terminal of the electro-magnet H H is at $x$ between washers upon a screw passing through the projecting arm L and carrying at its other end a spring $m$, the whole supported by but insulated (by a sleeve and washers) from the projecting arm L. The end of the spring $m$ carries a contact-point arranged to press against a similar point on the projection $n$, carried by the armature-lever G at all times, except when the armature I is drawn close to the magnet H H, and is detained by the spring-catch $j$. Similarly one terminal of the magnet F F is at $o$, and a screw and washers similar to those at $x$ are supported in the standard N. A light arm $p$, held by such screw, carries at its outer end a contact-point, which presses against a similar point on a spring $q$, carried by the armature-lever $b$, such spring to be adjusted so that the points are electrically in contact, except when the armature $c$ is drawn close to the electro-magnet F F and detained by the spring $k$.

Figs. 4 and $4^a$ represent the pendulum of a regulator, provided with an electric-circuit make-and-break apparatus like that used in some observatories. A wire $r$, bent at right angles, is attached to the pendulum-rod and its pendent end (which is flattened parallel to the plane of motion of the pendulum) as the pendulum swings to and fro passes through contact-points $s$ and $t$, consisting of globules of mercury standing on the tops of two stationary small vessels, which latter are to be provided with adjusting-screws (not shown) to force the mercury above the top of each vessel in globular form, with which, as stated, the wire $r$ will come in contact and in turn close and open two independent electric circuits.

The two magnets F F and H H are severally electrically connected through switches P and O with batteries $u'$ and $u$ and contact-points $s$ and $t$. In connection with the latter the point $r$ on the pendulum opens and closes a separate electric circuit for each magnet. The returns or ground of both magnets pass in common through the pendulum, a special break-and-make apparatus $v$ $v'$ $v^2$, and a switch Q, from which they are again separated, to the terminals $o$ and $x$ of the two magnets. The current from $o$ passes along the piece $p$, the spring $q$, from thence, preferably by an insulated wire, down the lever and to the coils of the magnet F F, and from thence, as stated, to switch P, battery $u'$, and contact-point $s$. The current from $x$ passes through spring $m$ and bent arm $n$, thence, preferably by an insulated conductor, down the lever and to the coils of the magnet H H, and from the same, as stated, to switch O, battery $u$, and contact-point $t$.

The vessel carrying contact-point $s$ is so set that point $r$ will come in contact with it about one-tenth of a second before the pendulum reaches mid-position in moving from left to right, and the vessel carrying contact-point $t$ is so set that point $r$ will touch it when pendulum passes mid-position. For reasons explained hereinafter it is desirable to cut off the current through point $r$, except when point $r$ passes points $s$ and $t$ in moving from left to right. This can be accomplished by a circuit-breaker operated by the pendulum arranged to close the circuit after point $r$ passes point $s$ when moving to the left and to open it after point $r$ passes point $t$ in moving to the right. In the drawings, $v^2$ is a fork with a wide opening, which fork is to be pivoted to a stationary bar 60 in front of the pendulum, preferably a little to the left, and provided with a tumbling ball 61, arranged to fall either side of the center. A pin 62 in the rod strikes first one jaw of the fork and then the other as the pendulum swings, thereby leaving a bent arm $v'$, connected with the fork, down after the pendulum is swung to the left, so that its point dips in the mercury in a vessel $v$, connected to return-switch Q, and the fork $v^2$ being electrically connected to the pendulum-rod the circuit is complete to the point $r$ on such rod. As the pendulum swings to the right the connection $v'$ is lifted out of the mercury in vessel $v$ and the return-circuit broken. The fork is so proportioned that the connection $v'$ is not so lifted until the pendulum passes mid-position when moving to the right, and so that the connection $v'$ will not be returned to the vessel $v$ until after the pendulum has moved so far to the left that the point $r$ is out of contact with point $s$.

The operation outlined hereinbefore is with the particular apparatus described as follows: If a hair-spring is to be tested, it is attached to a standard-balance. If a balance is to be tested, it is attached to a standard hair-spring and the two placed in a movement or support E, arranged in a suitable chuck D on shelf C. Said movement E may be a full watch-movement for regular use as such or it may be a tool to receive a balance and hair-spring and may or may not be provided with the escapement, gearing, and mainspring required to maintain the motion of the balance continuously. In putting in the movement the clamp K is necessarily open, as shown in Fig. 3, and should be adjusted vertically by screw $i$ until the jaws of the clamp are equally distant from the rim of the balance. It is supposed that the collet is turned on the balance, so that the latter is in mid-position and hair-spring not strained when one balance-screw is in the position shown lying against the stop $a$. The hair-spring is then to be partially wound or strained by moving the balance at the top half a turn to the right, and the opposite screw is caught by the catch $a$. It is evidently not necessary that the hair-spring be wound exactly a half-turn; but it should be wound the same each time of starting. The pendulum, Fig. 5, being in operation, if the three switches O P Q are closed the first movement of the pendulum from left to right thereafter will, through point s, in manner stated, close the circuit through the coils of electro-magnet F F, which will draw back the catch a, thereby releasing the balance, which will commence to vibrate. The armature c is retained by the spring-catch k after its circuit is opened by the continued motion of the pendulum. About one-tenth of a second afterward the circuit is closed through the point t, when the magnet H H, in manner described, releases the clamp K, which stops the balance at or about the middle of its movement, and any variation from this may be seen by the position of a side screw in relation to the scale k' at the left. As in the other case, the armature I is retained by the spring-catch j after the circuit is opened by the continued motion of the pendulum. After the observation the switch Q should be opened and the catch j released, when by pressing together the ends of the clamp K at the right the armature will return to the left by the action of the retracting-spring J², and the clamp be held open, thereby leaving the balance free. The armature-lever b should then be released by lifting spring-catch k, the hair-spring be again wound up one-half turn, the opposite screw caught upon the catch a, the switch O opened and Q closed, when the pendulum at its next beat will again release the balance in the manner previously stated; but the clamp will not be released until switch O is closed, which should be done after a sufficient interval has elapsed to determine the rate—say one or two minutes. When switch O is closed, the clamp will be operated the next time the pendulum moves from left to right, when the position of the balance-screw on the scale k' will show whether the balance for that interval has run fast or slow. If such screw be nearer point a' than on the first trial, it has fallen behind in running from right to left at the top and the balance is behind, and if it be nearer point a it has run ahead and corrections may be made accordingly.

It is realized that a definite time may elapse after the circuit is closed at t before the magnet H will be energized, the clamp closed, and the balance stopped; but this interval should be the same for each observation, so that if the point s be adjusted to or from t, so that the balance for the short trial is stopped nearly in mid-position, the slight departure from that shown on the preliminary trial may be allowed for in considering the position on scale k' after the longer trial. It will be observed that the arrangement insures that the balance is always moving in the same direction when stopped and the pendulum is always moving in the same direction when it closes the circuit, so that errors in adjustment in relation to the mid-position of either do not affect the result. The provision that the circuit of the two magnets H H and F F be broken by springs m and q, respectively, is not essential to the operation, but merely relieves the batteries, so that they are always at standard strength and ready to act as promptly at one time as another. The use of keys with retracting-springs in place of the switches O P Q will to a great extent accomplish the same purpose when the terminals o and x may be on the magnets themselves. In such case switches P and Q should be closed in starting an experiment and switches O and Q in stopping it. It will, however, be found convenient to at least stop the experiment by a time-movement, in which case switches O and Q must be closed and the circuit from switch O again broken in a time-movement—for instance, at switch R—and the movement arranged to close it again at the desired time. If desired, there will be no difficulty in arranging such a movement so that with switch Q closed the line through switch P would first be closed to start the balance undergoing test, and that through switch O closed a definite time afterward to stop the balance for inspection. Evidently a watch or marine movement with balance may be used to give the time-signals instead of a clock. So, also, the magnet H may be arranged to close the clamp K without depending upon spring e. Again, either magnet F F or H H may close a local circuit through its coils as its armature moves so as to hold the latter toward the magnet when the clock opens the circuit and springs j k be dispensed with, when it will simply be necessary to open the local circuit to permit armature to retract.

In Fig. 5, showing the distinctive features of the second modification referred to hereinbefore, w' is the balance to be tested, and z' a standard-balance, upon the staff of which is carried a light disk z, driven by light friction on the staff and carrying a needle or pointer z². The bridge supporting the standard balance is made with sufficient overhang to permit the needle to vibrate clear. The periphery of the disk z is provided with ratchet-teeth. A small lever S is pivoted to a piece T, capable of motion to and from the balance. The lever S is provided at the left with a bell-crank arm or an incline 12 and so arranged that it will be struck by one of the screws of the balance a little longer than the others, or by a pin in the balance-arm, as shown at 13 in Fig. 7. The right end of the lever is made in the form of a detent 14 to catch in the teeth of the disk z. Ordinarily the piece T is moved back to the position of the dotted lines, carrying with it the lever S, so that its ends do not engage with the balance w' or disk z. The piece T may be a slide, or, as will generally be most convenient, form the end of an armature-lever T', as shown in Fig. 9, which should be pivoted at the bottom, like the armature-lever b, Fig. 2. There is a catch a for each balance to be operated by the same magnet, and as in the other case each hair-spring is to be wound up one-half turn from left to right at the top and the balances detained by the catches. In this case the long screw or pin in the balance-arm for operating left-hand end of lever S will be one hundred and eighty degrees from the inclined surface 12 on such lever. Both balances being started together about one-tenth of a second before the pendulum is in mid-position, as in the other case, the sliding piece T is to be moved toward the balances about one-tenth of a second before the even second at which it is desired to stop the experiment, when the long screw or pin in the balance $w$ will strike the incline 12, throw out that end of the lever S, and throw the detent 14 at the right in the teeth of the disk $z$, thereby stopping such disk, and the needle $z^2$ will give a certain indication on a scale $z^3$. The needle $z^2$ would of course be adjusted in relation to the balance $z'$ after each stop, and by observing its position on a stationary scale after a short run, and again after a longer one, the rate of the balance with reference to the standard may evidently be determined on the same principles as before stated. It is proposed to make the sliding piece T the top of the armature-lever of an electric magnet, which will be operated by a circuit closed at point $s$ by the pendulum, but independent of the circuit of the magnet operating the catches $a$. Each of the circuits is to be provided with a separate switch, when evidently the balances will be started by closing the circuit on the magnet-operating stops $a\ a$, and the circuit of the magnet-operating slide T can either be closed at the same time, when the stop would be made one-tenth of a second after, or a certain number of minutes afterward, as desired. The lever S is shown made with a short arm 50, which is held against a stop by a small spring, shown below the right-hand arm of the lever. When lever S is moved, the short arm 50 may be arranged to come in contact with a point $y$ and thereby close an electric circuit operating in the manner described in relation to the previous figures to close a clamp K to grasp the disk $a$ and supplement the action of the catch upon the ratchet on its edge. The sliding piece T may be moved toward the balances by the direct action of a time-movement controlled, for instance, by the standard-balance, the mechanism used being substantially the same as is familiar in various stop devices for watches. Evidently, also, a clamp K may be provided for each of the balances $w'$ and Z, and the same be operated by the same magnet, when the balances being started together, as described, the change in angle indicated, when stopped together, will show the difference in rate.

As shown in Fig. 7, representing the distinctive features required for the third modification mentioned hereinbefore, the motion of the balance to be tested may in a way similar to that described operate a lever S', when the fulcrum thereof on a sliding piece T' is moved toward such balance and the opposite end of such lever may carry a pencil or stylus 15, bearing on the cylinder U of a chronograph. It is understood that the surface of the cylinder will be moving rapidly—for, instance, from right to left—and that another pencil or stylus 16, bearing thereon, would by an electro-magnet be operated by a circuit from a point $t$ of the clock at the even second, thereby making a V-shaped diversion in the line marked on the chronograph-cylinder. If the balance $w^2$ be started one-tenth of a second before the even second and slide T' operated to bring lever S' toward the balance, the mark made by the stylus 15 will be nearly opposite that made by the stylus 16 and the variation can be noted. If, however, the interval between the starting of the balance and the operation of the lever S be increased, the divergence of the two V-shaped marks on the chronograph-cylinder will show whether the balance being tested is fast or slow, and the amount of the variation can be determined by the distance between consecutive diversions made by the stylus 16, if permitted to operate every second. As is common in chronographs, the lines made by each stylus on its surface may be in spiral lines, if desired. Ordinarily the chronograph-cylinder may be stopped for the greater portion of the time between observations, so long as its average velocity is known, and only started a sufficient time before an observation to enable it to obtain normal speed.

A counter or register of any kind showing the distance it has moved is considered the equivalent of a chronograph when arranged to give an indication of the time it is started and stopped. For instance, if such a counter be started at zero when the balance is started and then run uniformly a certain number of units per second until it is stopped by the operation of the balance through the lever S', &c., the number of units shown by the counter will furnish a basis of calculating the rate of the balance.

By the use of the chronograph or equivalent a modification of the apparatus shown in Figs. 5 and 7 is available for rating a watch-movement at a distance from the comparator—for instance, when placed in a compartment under regulated temperature. This only requires that a lever like S, Fig. 5, be mounted with a watch-movement and apparatus provided to move it toward the balance after a proper interval has elapsed and when the balance is vibrating in the prearranged direction. Very many modifications of stop-motions may be used for this purpose, of which one adaptation is shown in Fig. 8. It is supposed that the balance $w^3$ to be tested regulates a watch-movement and that operated by such movement is an arbor 2, turning at the top from left to right in a definite number of seconds. An extra train is to be planted between the same plates, of which any wheel 3 operated thereby—for instance, the great wheel—carries a number of pins 4 4 4 4. An arbor running at a higher velocity in the auxiliary train is to carry a fly 5, provided with two arms set opposite each other radially, but in different longitudinal positions. The arbor 2 is to be cut half through from opposite sides in the different longitudinal planes occupied by the arms of the fly 5 and each of said arms arranged to pass in turn through one of the cuts. The effect then is that every time the arbor 2 makes half a turn the fly-shaft makes half a turn, and the parts should be so proportioned that for each of such movements a pin 4 will press the outer incline 7 on lever $S^2$ and pass by, so that the inner incline 8 will come in contact with the pin 9 or any prearranged projection on the balance and the opposite end 19 of the lever be thrown in contact with an electric conducting-point 6, and close a local electric circuit operating through an electro-magnet a stylus 10 on a chronograph-cylinder 11 in the observing-room at any desired distance. The lever $S^2$ has upon it a projecting arm 17, upon the end of which bears the V end of the spring 18, so arranged that when the lever is moved by the balance $w^3$ the V end of spring in sliding off the end of lever 17 completes the movement and insures closing the electric circuit on 6 and also throws the V point 8 clear of the balance. When, however, the left end of the lever $S^2$ is moved toward the balance by a pin 4, the spring 18 rides upon a flat piece at the end of lever 17 and merely holds it by friction. It is evident that in either of the cases mentioned the inclined ends of the levers S S' $S^2$ may be so adjusted in relation to the long screw or operating pin on the balance that the motion of the balance in throwing the lever will merely be slightly checked instead of being entirely stopped. In the modification shown in Fig. 8 it is intended that the adjustment be as last above described, that the movement with apparatus described shall be placed in a room under regulated temperature, its electric terminals connected with the chronograph in the observing-room, and when running regularly the auxiliary movement will from time to time be released and indications be made on the chronograph, which by comparison with those made by another stylus indicating standard time will show the rate of the movement undergoing test.

Another modification practically equivalent to that first above referred to may be explained in connection with Figs. 5 and 6. In such case the standard-balance $z'$ and lever S are to be omitted and the disk $z$ is to be retained, as well as a needle corresponding to $z^2$; but, as shown by dotted line 31, this needle is to be made longer and preferably placed sufficintly below the disk to permit a clamp K to operate upon such disk, the needle 31 to be normally just below a pin 30 on the balance $w'$, Fig. 6, and in plan, as shown in Fig. 5, the spindle of the disk $z$ to be extended down and so arranged that it may be lifted by the electro-magnet 32 through the armature-lever shown. When so lifted, the needle will be struck by pin 30 as balance $w'$ vibrates. The needle 31 and disk $z$ may be fastened to the same hub or elastically connected by a coiled spring. If, then, the hair-spring of balance $w'$ be wound at the top from left to right and caught with pin 30 at the left, or, say, one hundred and eighty degrees from its mid-position, and arm 31 be in the position shown in Fig. 5, if the disk $z$ and needle 31 be raised by magnet 32 less than one-fifth—say one-tenth—of a second before the even second and the balance be released, more accurately, one-tenth of a second before the even second—both, say, by separate currents through electric contact-point $s$ in Fig. 4, as before—the pin 30 on balance will strike the arm 31 and carry it with it, when if at the even second the disk $z$ be suddenly clamped, as described in relation to the balance, Fig. 1, the balance $w'$ will be checked by the spring of arm 31, and when the pin 30 in balance runs by the end or is otherwise carried back free of the needle 31 the latter will resume its normal position in relation to the disk $z$ and indicate on a stationary scale the relative position of the balance $w'$ at the even second, and similar tests made for long and short intervals show the rate of the balance, as before.

The comparator when constructed according to either of the modifications stated would have all its parts for the same location mounted on one frame, as in Figs. 1, 2, and 3, which evidently may as a whole be inclosed in a case with glass sides and connected to apparatus for circulating air under regulated temperature, the same as the comparators described in the application previously referred to and in this way the rate of a watch-movement be tested at different temperatures. So, also, as in the previous application, by simply clamping all parts fast the comparator as a whole, with the movement, may be placed in different positions, so as to test the rate of the movement for position.

It will be observed in all the modifications, first, that the angular position of the balance itself is indicated relatively to standard time either by stopping the balance undergoing test or another started in connection therewith or by indicating its position in relation to another balance, a chronograph, or an indicator; second, means are provided to start the balance undergoing test in definite relation to the beat of the standard time-piece, so that the stop or indication will be made at or near the time the balance undergoing test is moving at maximum velocity; third, the general effect of this method of operation, carried out substantially like either of the different modifications, is that the indication from which the difference in rate is determined is derived by dividing the time required for a single beat of the balance as distinguished from that class of apparatus in which it is provided simply to ascertain the number of beats in a given number of minutes. The balance itself moves through so many degrees in a single beat that the effect of dividing the large angle of motion is to secure very accurate results during comparatively short intervals.

What I claim as my invention, and desire to secure by Letters Patent, is—

1. The method of rating watch-balances, which consists in starting the balance from a definite position at a definite time by an initial impulse derived from a standard time-piece and in stopping the balance or otherwise mechanically indicating its position after a definite interval by an initial impulse, also derived from a standard time-piece, and deducing the rate of the balance from its angular position at the end of a definite interval, substantially as and for the purposes specified.

2. The method of rating watch-balances, which consists in starting the balance from a definite position at a definite time by an itial impulse derived from a standard time-piece and in stopping the balance or otherwise mechanically indicating its position after a definite interval by an initial impulse, also derived from a standard time-piece, and deducing the rate of the balance from the difference in its angular position at the end of definite intervals of unequal length, substantially as and for the purposes specified.

3. In combination with a standard time-piece provided with a circuit make-and-break apparatus and in combination with a balance to be rated and with suitable apparatus for indicating the position of the balance after a definite time, a catch to hold said balance when the hair-spring is wound to a definite extent, and suitable mechanism for operating such catch at a definite time by an impulse initiated by a standard time-piece, substantially as and for the purposes specified.

4. In apparatus for rating a balance, provided with means for indicating the position of the balance at a definite time, means for starting such balance from a definite position at a definite time, substantially as and for the purposes specified.

5. In combination with a standard time-piece provided with a circuit make-and-break apparatus and in combination with a balance to be rated and apparatus to start such balance at a definite time, a clamp to stop such balance, and means to secure the operation of such clamp at a definite time relative to the beat of the standard time-piece by an initial movement derived from such time-piece, substantially as and for the purposes specified.

6. In apparatus for rating a balance, provided with a device for stopping the same, an electro-magnet for operating such device energized at a definite time by an electric current from a standard time-piece, substantially as and for the purposes specified.

7. In combination with a standard time-piece provided with a circuit make-and-break apparatus and in combination with a balance to be rated and with apparatus to start the balance from a definite position at a definite time by an initial impulse derived from such time-piece, suitable apparatus for mechanically indicating the position of the balance after a definite interval in relation to the beat of the standard time-piece, substantially as and for the purposes specified.

8. In apparatus for rating a balance, a clamp to stop the balance without injury, consisting, essentially, of two substantially similar jaws with devices for closing the same operating equally and symmetrically on each jaw, substantially as and for the purposes specified.

9. In apparatus for rating watches by stopping the balance, a clamp with substantially symmetrical arms, a retracting-spring acting equally on each, and stops to hold the jaws apart, in combination with a removable stop for permitting the jaws to approach under the action of the spring, substantially as and for the purposes specified.

10. In combination with a tool designed to hold a watch-balance where it may be vibrated in a definite position and with a clamp for gripping such balance, devices for adjusting the jaws of the clamp in relation to the balance, so that the latter will ordinarily run entirely free and the clamp when released be free to grip the balance in any position without straining the same, substantially as and for the purposes specified.

11. In apparatus for comparing balances and in combination therewith and with a standard time-piece and suitable connections, two electric contact-points so arranged that an electric circuit will be made in each successively at definite intervals, one to put in operation means to start the balance, the other to put in operation means to indicate its position, substantially as and for the purposes specified.

12. In combination with an apparatus for rating balances, a standard time-piece provided with double electrical contact-points and suitable electric make-and-break apparatus operated automatically by the time-piece, whereby two impulses will be sent out at definite intervals in relation each to the other and in definite order in relation to the even second, substantially as and for the purposes specified.

13. In apparatus for rating a balance, provided with an electro-magnet for operating apparatus for releasing or stopping the balance by current derived from a circuit make-and-break attachment to a time-piece, a spring-catch for holding the armature in position at will after the circuit is again opened by the continued motion of the circuit-breaking device, substantially as and for the purposes specified.

CHAS. E. EMERY.

Witnesses:
G. C. PENNELL,
J. A. RUOFF.